United States Patent
Adachi

(10) Patent No.: US 11,829,029 B2
(45) Date of Patent: Nov. 28, 2023

(54) PLANAR ILLUMINATION DEVICE

(71) Applicant: MINEBEA MITSUMI Inc., Nagano (JP)

(72) Inventor: Kazumasa Adachi, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 5 days.

(21) Appl. No.: 17/596,855

(22) PCT Filed: Jun. 4, 2020

(86) PCT No.: PCT/JP2020/022104
§ 371 (c)(1),
(2) Date: Dec. 20, 2021

(87) PCT Pub. No.: WO2021/039008
PCT Pub. Date: Mar. 4, 2021

(65) Prior Publication Data
US 2022/0317515 A1    Oct. 6, 2022

(30) Foreign Application Priority Data

Aug. 23, 2019    (JP) .................................. 2019-152787

(51) Int. Cl.
*G02F 1/00* (2006.01)
*G02F 1/13357* (2006.01)
(Continued)

(52) U.S. Cl.
CPC .... *G02F 1/133603* (2013.01); *G02F 1/13362* (2013.01); *G02F 1/133605* (2013.01);
(Continued)

(58) Field of Classification Search
CPC ........ G02F 1/133603–133607; G02F 1/13362; G06F 1/1609; G02B 6/0073
See application file for complete search history.

(56) References Cited

U.S. PATENT DOCUMENTS

| 2015/0192824 A1* | 7/2015 | Hirota | G02B 6/0088 |
| | | | 348/725 |
| 2017/0212302 A1* | 7/2017 | Yokawa | G02B 6/0085 |
| (Continued) | | | |

FOREIGN PATENT DOCUMENTS

| JP | 2004-258460 A | 9/2004 |
| JP | 2019-029081 A | 2/2019 |
| WO | 2018/043460 A1 | 3/2018 |

OTHER PUBLICATIONS

International Search Report for corresponding International Application No. PCT/JP2020/022104 dated Aug. 11, 2020.
(Continued)

*Primary Examiner* — Gerald J Sufleta, II
(74) *Attorney, Agent, or Firm* — Pearne & Gordon LLP

(57) ABSTRACT

A planar illumination device according to an embodiment includes a light guide plate, a light source, a top frame, and a plurality of optical sheets. The light guide plate receives light from a light incident side surface. The light source emits light to the light incident side surface of the light guide plate. The top frame covers a light exit surface side of the light guide plate. The plurality of optical sheets are disposed at the light exit surface side of the light guide plate, and an end portion is fixed at a rear side of a frame portion of the top frame.

12 Claims, 8 Drawing Sheets

(51) Int. Cl.
  *G02F 1/1335* (2006.01)
  *G06F 1/16* (2006.01)
  *F21V 8/00* (2006.01)

(52) U.S. Cl.
  CPC ...... *G02F 1/133607* (2021.01); *G06F 1/1609* (2013.01); *G02B 6/0073* (2013.01)

(56) References Cited

U.S. PATENT DOCUMENTS

2019/0204678 A1* 7/2019 Hosoki ................ G02B 6/0056
2019/0212489 A1* 7/2019 Xu ........................ G02F 1/1335
2020/0032970 A1* 1/2020 Sasaki .................... F21S 2/005

OTHER PUBLICATIONS

Written Opinion for corresponding International Application No. PCT/JP2020/022104 dated Aug. 11, 2020.
International Preliminary Report on Patentability dated Dec. 1, 2020 for corresponding International Application No. PCT/JP2020/022104 and English translation.

\* cited by examiner

PLANAR ILLUMINATION DEVICE

CROSS REFERENCE TO RELATED APPLICATIONS

This application claims the benefit of priority to Japanese Patent Application Number 2019-152787 filed on Aug. 23, 2019. The entire contents of each of the above-identified application are hereby incorporated by reference.

TECHNICAL FIELD

The disclosure relates to a planar illumination device.

BACKGROUND

A planar illumination device known as an edge-light planar illumination device receives light from a light incident side surface of a light guide plate and outputs the light from a main surface of the light guide plate. Such a planar illumination device is used as, for example, a backlight in a liquid crystal display device.

In a typical planar illumination device, a top frame provided with an opening for outputting light is often used as part of a housing, and the portion of the top frame that forms the opening for outputting light is referred to as a frame. In recent years, to achieve better design, there has been a demand for narrowing the frame width, that is, frame narrowing.

In addition, in the planar illumination device, in order to adjust luminance uniformity or light distribution properties, various types of optical sheets, such as a diffusion sheet, a prim sheet, and a luminance enhancement sheet, are layered on a light exit surface side of the light guide plate (see, for example, JP 2019-29081 A and JP 2004-258460 A). The optical sheets are typically fixed to a peripheral edge portion or a space or the like of the light guide plate.

SUMMARY

However, narrowing of the frame of the planar illumination device has led to a reduction in locations for fixing an optical sheet, making it difficult to stably fix the optical sheet. In particular, since the coefficient of linear expansion of the optical sheet varies depending on the base material, due to the coefficient of linear expansion of an element to which the optical sheet is fixed or due to the fixing method, a wrinkle may occur deteriorating the optical properties, the fixing may detach causing rattle noises, the external appearance may be affected, or the like.

In light of the foregoing, the disclosure is directed at providing a planar illumination device that can stably fix an optical sheet even in a case where the frame is narrowed.

In order to solve the problem described above and achieve the object, a planar illumination device according to an aspect of the disclosure includes a light guide plate, a light source, a top frame, and a plurality of optical sheets. The light guide plate receives light from a light incident side surface. The light source emits light to the light incident side surface of the light guide plate. The top frame covers a light exit surface side of the light guide plate. The plurality of optical sheets are disposed at the light exit surface side of the light guide plate, and an end portion is fixed at a rear side of a frame portion of the top frame.

With the planar illumination device according to an aspect of the disclosure, it is possible to stably fix an optical sheet even in a case where the frame is narrowed.

DESCRIPTION OF EMBODIMENTS

Figure 1:
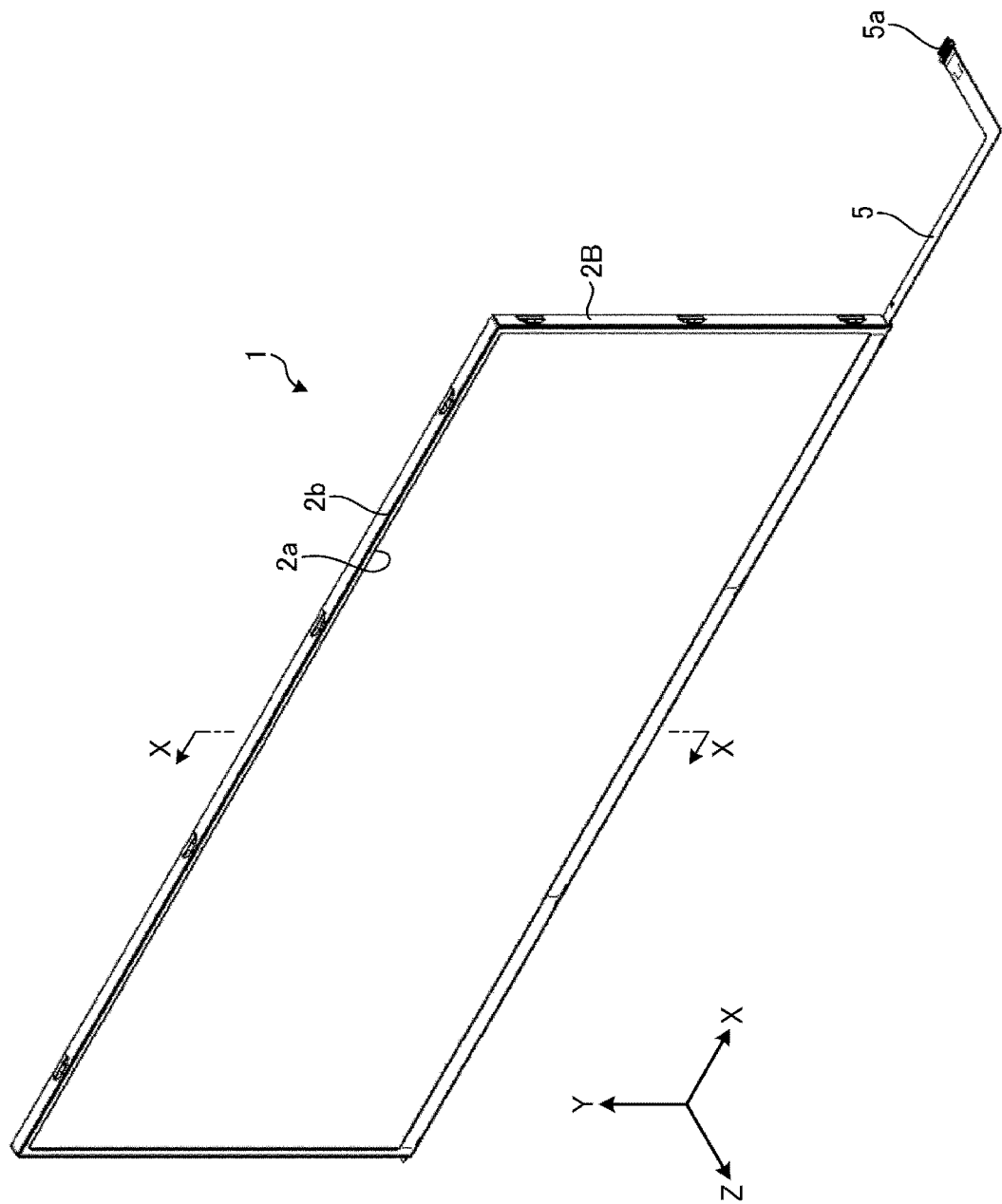
FIG. 1 is an external perspective view illustrating a planar illumination device according to an embodiment.

A planar illumination device according to an embodiment will be described below with reference to the drawings. Note that the disclosure is not limited to the embodiment described above. Further, the dimensional relationships, proportions, and the like between elements in the drawings may differ from reality. Among the drawings, portions having mutually different dimensional relationships and proportions may be included. Furthermore, the contents described in one embodiment or modified example are applied in principle to other embodiments or modified examples.

FIG. 1 is a perspective view of a planar illumination device 1 according to one embodiment, as seen from the side of a light exit surface. In FIG. 1, for the sake of convenience, the direction along the long side of a housing of the planar illumination device 1 is the X-axis direction, the direction along the short side of the housing is the Y-axis direction, and the direction along the thickness of the housing is the Z-axis direction.

In FIG. 1, the external shape of the planar illumination device 1 is a substantially rectangular (may have a substantially square shape) plate-like shape, and a top frame 2B is exposed at a light exit surface side that is a side toward the viewer of the diagram. A bottom frame (2A) is located on the non-illustrated rear surface side in the diagram. An opening 2a from which light exits is formed inside the top frame 2B. A portion surrounding the opening 2a forms a frame portion 2b. In addition, a portion of a light source substrate 5 is provided extending from the planar illumination device 1 in the positive X-axis direction. A connection portion 5a used for electrical connection to the outside is provided on the tip of the light source substrate 5. The top frame 2B is formed from a sheet metal made of stainless steel or the like. In a case where the planar illumination device 1 is used as a backlight of a liquid crystal display device or the like, the liquid crystal display device or the like is installed on the side where the opening 2a and the frame portion 2b are located.

Figure 2:
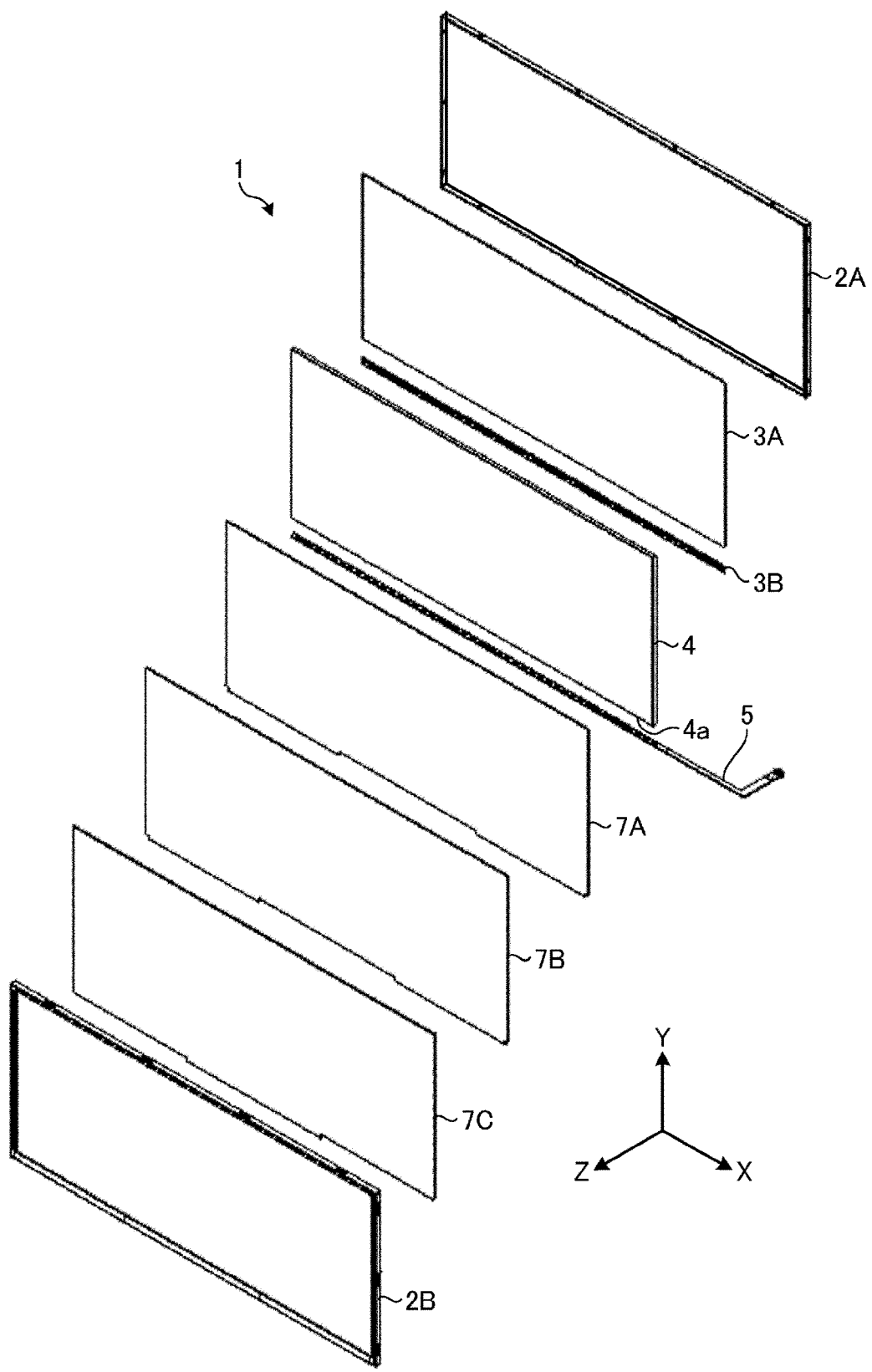
FIG. 2 is an exploded perspective view illustrating main components of the planar illumination device.

FIG. 2 is an exploded perspective view of main components of the planar illumination device 1 as seen from the side of a light exit surface as in FIG. 1. In FIG. 2, the planar illumination device 1 is configured such that a reflector 3A together with a partial reflector base portion 3B, a light guide plate 4, and optical sheets 7A to 7C are layered in this order from the bottom frame 2A at the top of the diagram, and the top frame 2B serves as a lid on these components.

The bottom frame 2A includes a bottom part, and four side walls surrounding the periphery of this bottom part. The top frame 2B includes the frame portion (2b) in which the opening (2a) is formed and four side walls surrounding the periphery of this frame portion.

The reflector 3A and the partial reflector base portion 3B (portion including a connection supporting portion 102 (FIG. 3) that will be described later) are disposed between the light guide plate 4 and the bottom part of the bottom frame 2A, and are an optical member configured to reflect light leaking to a surface disposed at an opposite side from the light exit surface of the light guide plate 4 to output the light to the light exit surface side. The partial reflector base portion 3B is fixed by both the light guide plate 4 and the bottom frame 2A. The reflector 3A is not fixed by the light guide plate 4, and an end portion is fixed by the bottom frame 2A. In addition, a gap (clearance) having a predetermined width and required at the time of assembling is provided between the reflector 3A and the partial reflector base portion 3B.

The light guide plate 4 is an optical member in which light incident on the light incident side surface 4a is guided into the interior, and outputs the light from a main surface on the side opposite to the reflector 3A. The light source substrate 5 is fixed to the bottom frame 2A at the light incident side surface 4a side of the light guide plate 4. The light source substrate 5 is formed of a flexible printed circuit (FPC) or the like. A plurality of (a large number of) light sources 5b such as LEDs are disposed at a portion of the light source substrate 5 that is opposed to the light incident side surface 4a. Note that while a top-view type LED that emits light from the top surface is used in the illustrated example, a side-view type LED that emits light from a side surface may be used.

End portions of the optical sheets 7A to 7C are fixed at a rear surface of the top frame 2B at the light entering side. Details will be described later. The optical sheet 7A is an optical member such as a diffuser sheet. The optical sheet 7B is an optical member such as a prism sheet, a brightness enhancement film (BEF), or the like. The optical sheet 7C is an optical member such as a reflective polarizer film, a dual brightness enhancement film (DBEF), or the like.

Figure 3:
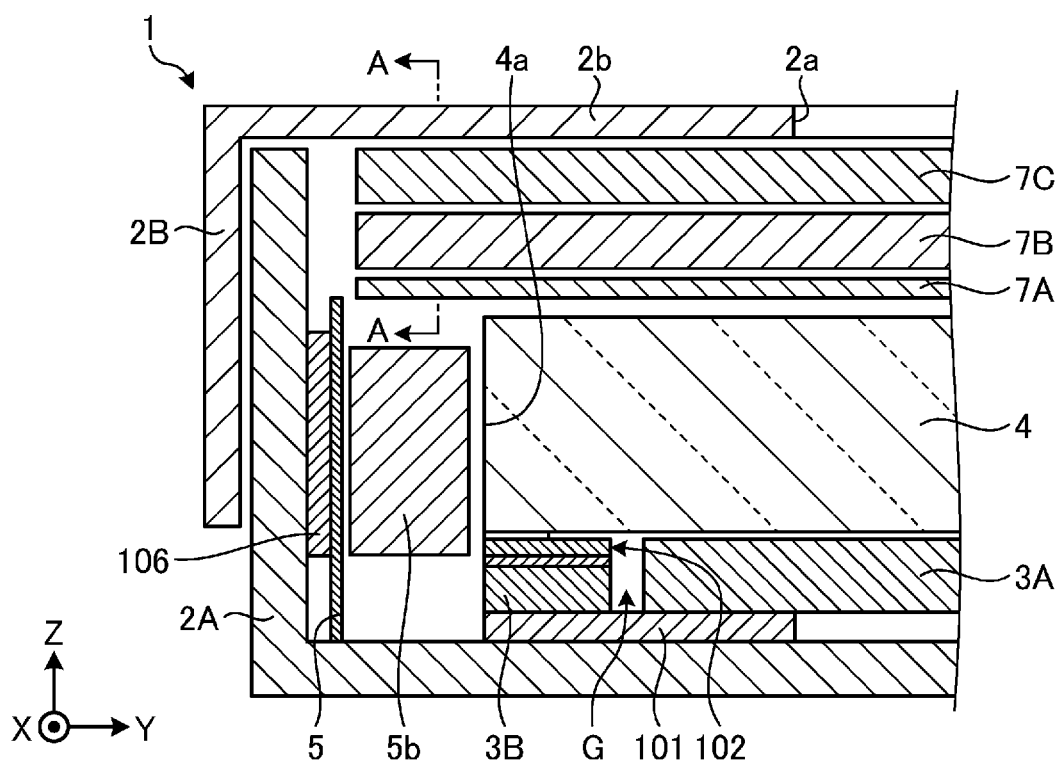
FIG. 3 is a partial diagram (left side portion) of a cross-sectional view taken along line X-X of the planar illumination device in FIG. 1.

FIG. 3 is a cross-sectional view taken along line X-X of the planar illumination device 1 in FIG. 1 and illustrates a portion (left side portion) of the device, and the upward direction in the drawing is illustrated as a direction in which light is output. In FIG. 3, at the inner surface of the bottom part of the bottom frame 2A, a one-side main surface of the reflector base portion 3B serving as a first portion of a reflector and a main surface at the end portion side of the reflector 3A serving as a second portion of the reflector are commonly fixed through a fixing member 101 such as a white double-sided tape having strong adhesion. The connection supporting portion 102 is fixed at a main surface of the partial reflector base portion 3B that is disposed at an opposite side from the fixing member 101. The reflector 3A is made out of a material, such as a biaxially stretched polyester film, having a light reflection property and having, at the inner side, air bubbles, whereas the partial reflector base portion 3B is made out of a material, such as white polyethylene terephthalate (PET), having a light reflection property and not having air bubbles at the inner side.

A main surface of the connection supporting portion 102 that is disposed at an opposite side from the partial reflector base portion 3B is fixed at a main surface of the light guide plate 4 at the light incident side surface 4a side. A main surface of the reflector 3A that is disposed at an opposite side from the fixing member 101 is not fixed at the light guide plate 4. A gap G serving as a clearance necessary for assembling is provided between the first portion of the reflector and the second portion of the reflector.

Figure 4:
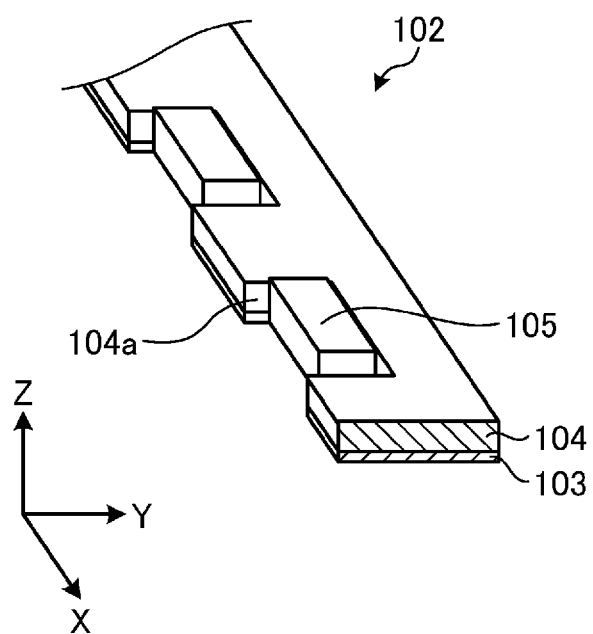
FIG. 4 is a perspective view partially illustrating a connection supporting portion.

FIG. 4 is a perspective view partially illustrating the connection supporting portion 102. In FIG. 4, the connection supporting portion 102 is configured such that a base member 104 having a band shape and made of PET or the like is fixed at a fixing member 103 having a band shape and comprised of a double-sided tape or the like, and a notch 104a having substantially a rectangular shape is formed at both of the fixing member 103 and the base member 104. The base member 104 may be comprised of a member (white PET or the like) having a light reflection property. In addition, a fixing member 105 such as a thermocompression bonding tape is disposed in each notch 104a, and the fixing member 105 fixes the partial reflector base portion 3B and the light guide plate 4. The thermocompression bonding tape is made out of, for example, polyurethane or the like, and is melted through application of heat to adhere. Note that, for the fixing member 105, it may be possible to use a thing made out of the same polyurethane or the like, having a type of adhesive that can be applied using a syringe or the like, not requiring any heat source, and curing with moisture in the air. A surface of the fixing member 103 that is disposed at an opposite side from the base member 104 is fixed at the partial reflector base portion 3B.

The fixing member 105 is disposed in a staggered manner and between adjacent light sources 5b such as LEDs, and is configured so as to reduce an influence, on an optical identification, of total reflection at a contact surface between the fixing member 105 and the light guide plate 4. The notches 104a of the base member 104 and the fixing member 103 function as a flow stopper when the fixing member 105 such as a thermocompression bonding tape melts, and increase a predetermined adhesion area and a thickness to achieve adhesive strength. Note that the notch 104a has one end being opened for the purpose of facilitating processing. However, it may be a hole surrounding the fixing member 105.

In this manner, in addition to the function as a flow stopper for the fixing member 105, the connection supporting portion 102 is configured such that the base member 104 opposed directly to the light guide plate 4 has a light reflection property. This makes it possible to make the connection supporting portion 102 together with the partial reflector base portion 3B function as a reflector, which makes it possible to enhance and complement the function of the reflector. In addition, the enhanced and complemented function of the reflector eliminates the need of the partial reflector base portion 3B having a high light reflection property. This makes it possible to increase a range of options in terms of materials of the partial reflector base portion 3B.

Returning to FIG. 3, the light source substrate 5 is fixed at the inner surface of a side wall of the bottom frame 2A through a fixing member 106 such as a double-sided tape. The light exit surface of the light source 5b at the light source substrate 5 is opposed to the light incident side surface 4a of the light guide plate 4.

On the other hand, the end portions (may include an ear portion (tongue piece) on an as-necessary basis) of the optical sheets 7A to 7C are fixed at the rear side of the frame portion 2b of the top frame 2B. Details will be described later. In addition, the top frame 2B is placed at the opening side of the bottom frame 2A, and the bottom frame 2A and the top frame 2B form a housing. Note that a portion of the gap G between the partial reflector base portion 3B and the reflector 3A is disposed in a dead area covered with the frame portion 2b of the top frame 2B. In addition, for example, the fixing member 101 comprised of a white tape (made of a material having a light reflection property) is disposed at a lower portion side. This reduces an influence on light output from the opening 2a.

Figure 5:
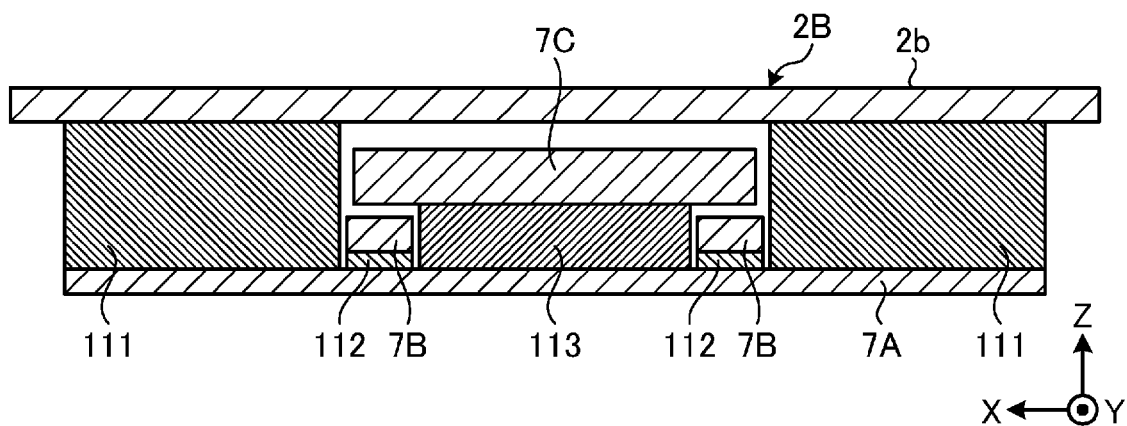
FIG. 5 is a cross-sectional view taken along line A-A in FIG. 3 and illustrates an example #1 of arrangement of optical sheets.

FIG. 5 is a cross-sectional view taken along line A-A in FIG. 3 and illustrates an example #1 of arrangement of the optical sheets 7A to 7C. In FIG. 5, portions of both end portions of the optical sheet 7A are fixed, through a thick fixing member 111, at corresponding ends of a rear surface of the frame portion 2b of the top frame 2B in a direction in which the frame portion 2b extends. The thick fixing member 111 can be obtained, for example, by alternately layering a fixing member such as a double-sided tape and a base member made of PET or the like. In addition, portions (a pair of ear portions) of end portions of the optical sheet 7B are fixed, through a fixing member 112 such as a double-sided tape, at an inner surface of the optical sheet 7A that is disposed at the inner side of the fixing member 111 at both ends. Furthermore, portions (ear portions formed at a center part) of end portions of the optical sheet 7C are fixed, through a fixing member 113 such as a double-sided tape, at an inner surface of the optical sheet 7A that is disposed at the inner side of the fixing member 112.

For example, the coefficient of linear expansion ($\times 10^{-5}$/K) of the top frame 2B made of stainless steel (SUS430) is 1.04. The coefficient of linear expansion of the optical sheet (DIF) 7A is 2.5. The coefficient of linear expansion of the optical sheet (BEF) 7B is 2.58. The coefficient of linear expansion of the optical sheet (DBEF) 7C is 7.59. That is, the coefficient of linear expansion of the top frame 2B is the smallest, and the coefficient of linear expansion increases in the order of the optical sheet 7A, the optical sheet 7B, and the optical sheet 7C.

Thus, the optical sheet 7A having the smallest coefficient of linear expansion of all the optical sheets 7A to 7C is fixed at both end portions of the top frame 2B. This reduces a difference between the amount of expansion or contraction, within the area of fixing, of the top frame 2B due to a change in temperature and the amount of expansion or contraction of the optical sheet 7A. Thus, it is possible to suppress occurrence of a wrinkle at the optical sheet 7A. Note that the thick fixing member 111 deforms in the shearing direction, which provides an effect of absorbing a difference between the amount of expansion or contraction of the top frame 2B due to a change in temperature and the amount of expansion or contraction of the optical sheet 7A.

In addition, the optical sheet 7B having the next smallest coefficient of linear expansion is fixed at the optical sheet 7A at the inner side of the fixing member 111. This reduces a difference between the amount of expansion or contraction, within the area of fixing, of the optical sheet 7A due to a change in temperature and the amount of expansion or contraction of the optical sheet 7B. Thus, it is possible to suppress occurrence of a wrinkle at the optical sheet 7A and the optical sheet 7B. Furthermore, the optical sheet 7C having the next smallest (the greatest) coefficient of linear expansion is fixed at the center part of the optical sheet 7A. This reduces a difference between the amount of expansion or contraction, within the area of fixing, of the optical sheet 7C due to a change in temperature and the amount of expansion or contraction of the optical sheet 7A. Thus, it is possible to suppress occurrence of a wrinkle at the optical sheet 7A and the optical sheet 7C.

Figure 6:
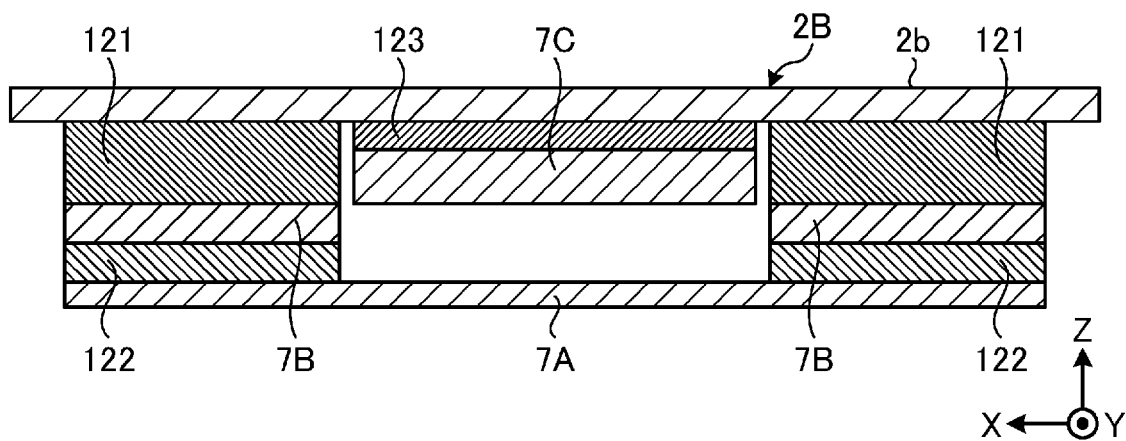
FIG. 6 is a cross-sectional view taken along line A-A in FIG. 3 and illustrates an example #2 of arrangement of optical sheets.

FIG. 6 is a cross-sectional view taken along line A-A in FIG. 3 and illustrates an example #2 of arrangement of the optical sheets 7A to 7C. In FIG. 6, portions of both end portions of the optical sheet 7B are fixed, through a fixing member 121 such as a double-sided tape, at corresponding ends of a rear surface of the frame portion 2b of the top frame 2B in a direction in which the frame portion 2b extends. In addition, portions of both end portions of the optical sheet 7A are fixed through a fixing member 122 such as a double-sided tape so as to continue to a portion where the fixing member 121 and the optical sheet 7B are fixed. Furthermore, portions of end portions of the optical sheet 7C are fixed through a fixing member 123 such as a double-sided tape, at a rear surface of the top frame 2B at the inner side of the fixing member 121. In this case, the optical sheets 7A and 7B having a relatively smaller coefficient of linear expansion are fixed at both end portions of the top frame 2B. In addition, the optical sheet 7C having a relatively greater coefficient of linear expansion is fixed at the center part of the top frame 2B. This reduces a difference between fixed elements in the amount of expansion or contraction due to a change in temperature. Thus, it is possible to suppress occurrence of a wrinkle at the optical sheets 7A to 7C.

Figure 7:
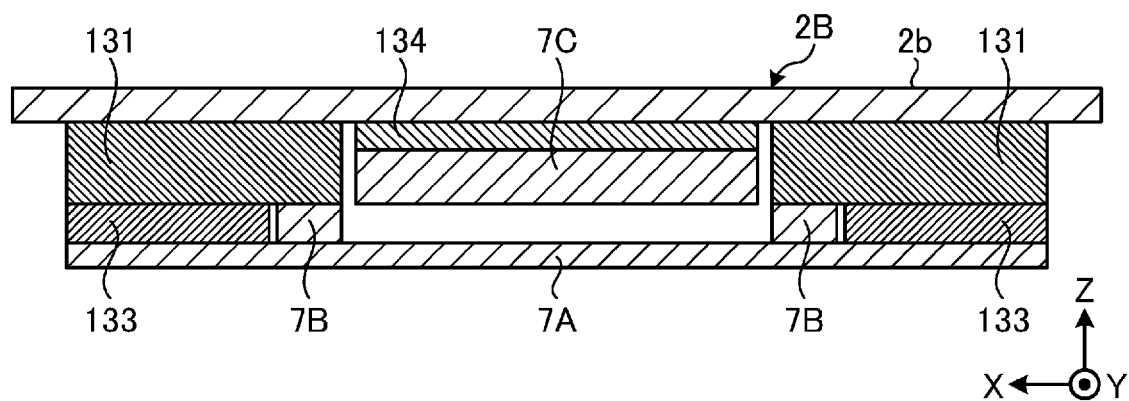
FIG. 7 is a cross-sectional view taken along line A-A in FIG. 3 and illustrates an example #3 of arrangement of optical sheets.

FIG. 7 is a cross-sectional view taken along line A-A in FIG. 3 and illustrates an example #3 of arrangement of the optical sheets 7A to 7C. In FIG. 7, a fixing member 133 such as a double-sided tape and portions (pair of ear portions) of end portions of the optical sheet 7B are fixed, through a fixing member 131 such as a double-sided tape, at both ends of the rear surface of the frame portion 2b of the top frame 2B in a direction in which the frame portion 2b extends. The fixing member 133 is disposed at an outer side, and the portions of the end portions of the optical sheet 7B are disposed at an inner side. In addition, portions of both end portions of the optical sheet 7A are fixed at an opposite side of the fixing member 133 from the fixing member 131. Furthermore, a portion of an end portion of the optical sheet 7C is fixed, through the fixing member 134 such as a double-sided tape, at an inner side of the fixing member 131 and at the rear surface of the top frame 2B. In this case, the optical sheet 7A having the smallest coefficient of linear expansion is fixed at both end portions of the top frame 2B. The optical sheet 7B having the next smallest coefficient of linear expansion is fixed at the inner side of the optical sheet 7A. The optical sheet 7C having the greatest coefficient of linear expansion is fixed at the center part of the top frame 2B. This reduces a difference between fixed items in the amount of expansion or contraction due to a change in temperature. Thus, it is possible to minimize occurrence of a wrinkle at the optical sheets 7A to 7C.

Figure 8:
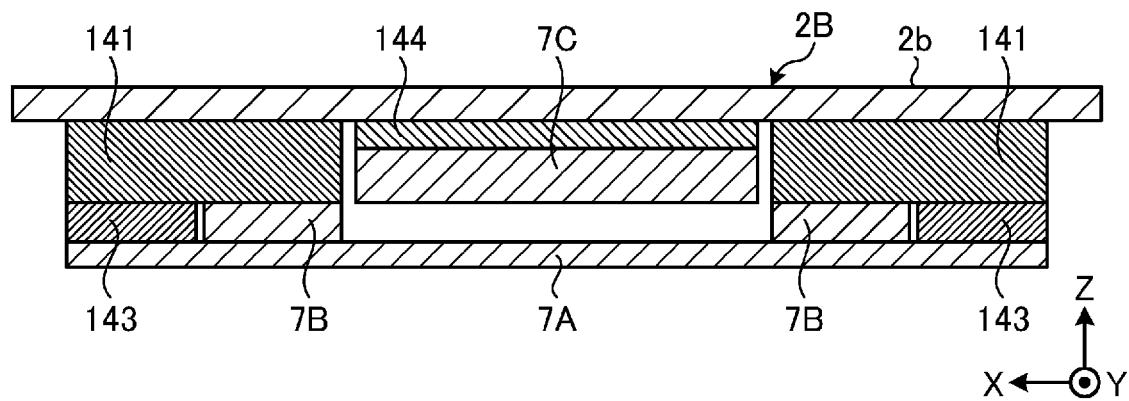
FIG. 8 is a cross-sectional view taken along line A-A in FIG. 3 and illustrates an example #4 of arrangement of optical sheets.

FIG. 8 is a cross-sectional view taken along line A-A in FIG. 3 and illustrates an example #4 of arrangement of the optical sheets 7A to 7C. FIG. 8 differs from FIG. 7 in that the width of the optical sheet 7B fixed to the top frame 2B through a fixing member 141 such as a double-sided tape is greater, and accordingly, the width of a fixing member 143 such as a double-sided tape to which an end portion of the optical sheet 7A is fixed is smaller. Both are similar in that the end portion of the optical sheet 7C is fixed, through a fixing member 144 such as a double-sided tape, at the center part of the top frame 2B. In this case, the optical sheet 7A having the smallest coefficient of linear expansion is fixed at both end portions of the top frame 2B. The optical sheet 7B having the next smallest coefficient of linear expansion is fixed at the inner side of the optical sheet 7A. The optical sheet 7C having the greatest coefficient of linear expansion is fixed at the center part of the top frame 2B. This reduces a difference between fixed items in the amount of expansion or contraction due to a change in temperature. Thus, it is possible to minimize occurrence of a wrinkle at the optical sheets 7A to 7C.

In addition, in FIGS. 5 to 8, portions (pair of ear portions) of end portions of the optical sheet 7B at both sides are fixed. However, it may be possible to employ a one-side fixed structure in which only one side of both sides is fixed. In FIG. 5, in a case where one of optical sheets 7B at both sides is not provided, the fixing member 112 used to fix this one sheet is also not necessary. In FIG. 6, in a case where one of optical sheets 7B at both sides is not provided, the fixing member 121, 122 used to fix this one sheet can be replaced with the thick fixing member 111 such as the fixing member 111 in FIG. 5. In FIG. 7, in a case where one of optical sheets 7B at both ends is not provided, it is possible to shorten the width of the fixing member 131 used to fix this one sheet. In FIG. 8, in a case where one of optical sheets 7B at both ends is not provided, it is possible to shorten the width of the fixing member 141 used to fix this one sheet.

Embodiments of the disclosure have been described above, but the disclosure is not limited to the embodiments described above, and various modifications are possible without departing from the spirit of the disclosure.

As described above, the planar illumination device according to the embodiment includes: the light guide plate configured to receive light from the light incident side surface; the light source configured to emit light to the light incident side surface of the light guide plate; the top frame configured to cover the light exit surface side of the light guide plate; and the plurality of optical sheets disposed at the light exit surface side of the light guide plate and including the end portion fixed at a rear side of the frame portion of the top frame. With this configuration, even when the frame is narrowed, various types of fixing can be performed at the rear side of the frame portion of the top frame, making it possible to stably fix the optical sheets.

In addition, of the plurality of optical sheets, a first optical sheet having the greatest coefficient of linear expansion is fixed directly or indirectly at the center part of the top frame in a direction in which the frame portion extends, and a second optical sheet having the next greatest coefficient of linear expansion is fixed directly or indirectly at both outer sides of or at either one outer side of the center part of the top frame. With this configuration, it is possible to perform fixing in a manner appropriate for the difference in the coefficient of linear expansion between optical sheets, which makes it possible to effectively prevent a wrinkle from occurring at the optical sheets.

In addition, the end portion of the first optical sheet is fixed directly at the rear side of the frame portion of the top frame through the fixing member. With this configuration, it is possible to provide one aspect of fixing the optical sheet.

Furthermore, the second optical sheet and the third optical sheet having a smaller coefficient of linear expansion than the second optical sheet are fixed, through a fixing member, at both end portions of the top frame in a direction in which the frame portion extends. With this configuration, it is possible to provide one aspect of fixing the optical sheet.

In addition, the third optical sheet having a smaller coefficient of linear expansion than the second optical sheet is fixed, through a fixing member, at both end portions of the top frame in a direction in which the frame portion extends, and the second optical sheet is fixed at an inner side than the fixing portion of the third optical sheet in the direction in which the frame portion extends. With this configuration, it is possible to provide one aspect of fixing the optical sheet.

Furthermore, the third optical sheet having a smaller coefficient of linear expansion than the second optical sheet is fixed, through a fixing member, at both end portions in a direction in which the frame portion extends, and the first optical sheet is fixed, through a fixing member, at the center part of the third optical sheet in the direction in which the frame portion extends. With this configuration, it is possible to provide one aspect of fixing the optical sheet.

Moreover, the disclosure is not limited to the embodiment described above. A configuration obtained by appropriately combining the above-mentioned constituent elements is also included in the disclosure. Further effects and modifications can be easily derived by a person skilled in the art. Thus, a wide range of aspects of the disclosure is not limited to the embodiment described above, and may be modified variously.

While preferred embodiments of the present invention have been described above, it is to be understood that variations and modifications will be apparent to those skilled in the art without departing from the scope and spirit of the disclosure. The scope of the disclosure, therefore, is to be determined solely by the following claims.

The invention claimed is:

1. A planar illumination device comprising:
   a light guide plate configured to receive light from a light incident side surface;
   a light source configured to emit light to the light incident side surface of the light guide plate;
   a top frame configured to cover a light exit surface side of the light guide plate; and
   a plurality of optical sheets disposed at a space between the light exit surface side of the light guide plate and a frame portion of the top frame, and each including an end portion adhering to and fixed at a side of the frame portion of the top frame, the side facing the light guide plate, through a fixing member.

2. The planar illumination device according to claim 1, wherein
   end portions of the plurality of optical sheets are fixed only through the fixing member having a planar shape and at the rear side of the frame portion of the top frame.

3. The planar illumination device according to claim 1, wherein
   end portions of the plurality of optical sheets are fixed only at the frame portion configured to cover the light incident side surface.

4. The planar illumination device according to claim 1, wherein
   a coefficient of linear expansion of the top frame is smaller than a coefficient of linear expansion of any of the plurality of optical sheets.

5. The planar illumination device according to claim 1, wherein
   of the plurality of optical sheets, a first optical sheet having a greatest coefficient of linear expansion is fixed directly or indirectly at the top frame at a center part in a direction in which the frame portion extends, and
   a second optical sheet having a next greatest coefficient of linear expansion is fixed directly or indirectly at the top frame at both outer sides of or at either one outer side of the center part.

6. The planar illumination device according to claim 5, wherein
the first optical sheet is fixed only at the center part, and
the second optical sheet is fixed only at both outer sides or only at either one outer side.

7. The planar illumination device according to claim 5, wherein
an end portion of the first optical sheet is fixed directly at the rear side of the frame portion of the top frame.

8. The planar illumination device according to claim 7, wherein
the second optical sheet and a third optical sheet having a smaller coefficient of linear expansion than the second optical sheet are fixed at both end portions of the top frame in the direction in which the frame portion extends.

9. The planar illumination device according to claim 7, wherein
a third optical sheet having a smaller coefficient of linear expansion than the second optical sheet is fixed at both end portions of the top frame in the direction in which the frame portion extends, and
the second optical sheet is fixed more at an inner side than a fixing portion of the third optical sheet in the direction in which the frame portion extends.

10. The planar illumination device according to claim 5, wherein
a third optical sheet having a smaller coefficient of linear expansion than the second optical sheet is fixed at both end portions in the direction in which the frame portion extends, and the first optical sheet is fixed at a center part of the third optical sheet in the direction in which the frame portion extends.

11. The planar illumination device according to claim 2, wherein the fixing member having the planar shape is a double-sided tape.

12. The planar illumination device according to claim 1, wherein in a direction in which light is output, part of the light guide plate facing the top frame directly faces with the optical sheets.

* * * * *